United States Patent [19]

Gerdau

[11] Patent Number: 4,666,473
[45] Date of Patent: May 19, 1987

[54] SEPARATOR FOR GASES AND LIQUIDS

[75] Inventor: Alfred Gerdau, Munich, Fed. Rep. of Germany

[73] Assignee: Rotorcomp Verdichter, GmbH, Munich, Fed. Rep. of Germany

[21] Appl. No.: 744,262

[22] Filed: Jun. 13, 1985

[51] Int. Cl.⁴ .............................................. B01D 50/00
[52] U.S. Cl. .......................................... 55/97; 55/320; 55/321; 55/418; 55/461; 55/465; 184/6.16
[58] Field of Search ............................ 55/97, 183–185, 55/187, 204, 320, 321, 325, 326, 332, 337, 462, 418, 439, 447, 465, 459 R, 461, 466, 473; 184/6.16; 62/468–470

[56] References Cited

U.S. PATENT DOCUMENTS

| | | | |
|---|---|---|---|
| 2,467,408 | 4/1949 | Semon | 55/325 |
| 2,642,949 | 6/1953 | Tyskewicz | 55/203 |
| 3,386,230 | 6/1968 | Riesberg | 55/337 |
| 3,654,748 | 4/1972 | Bloom | 55/465 |
| 3,778,984 | 12/1973 | Lawser | 62/470 |
| 3,885,933 | 5/1975 | Putney | 55/459 R |
| 3,955,945 | 5/1976 | Bauer | 55/185 |
| 4,070,166 | 1/1978 | Emanuelsson | 55/185 |

FOREIGN PATENT DOCUMENTS

| | | | |
|---|---|---|---|
| 287913 | 4/1967 | Australia | 55/337 |
| 31716 | 1/1927 | France | 55/461 |
| 952292 | 8/1982 | U.S.S.R. | 55/320 |

Primary Examiner—Bernard Nozick
Attorney, Agent, or Firm—Hauke and Patalidis

[57] ABSTRACT

A fluid separator for separating a liquid, such as an oil mist from a gaseous fluid, such as compressed air, the oil mist having been introduced into the compressed air in a compressor. The separator comprises a coarse separation section provided with an inlet directing the oncoming stream of gaseous fluid upon a surface causing coalescence and condensation of the mist of the liquid upon impact, in the form of droplets flowing by gravity to a sump. The stream of gaseous fluid is caused to flow away from the coarse separation section into a fine purification section in which the stream is passed through a fine filter cartridge, causing final condensation of the liquid and separation from the gaseous fluid. A fluid distributor is located at the inlet of the fine purification section and causes further condensation of the liquid by impact of the stream upon the wall of the fluid distributor. In addition, the fluid distributor separates the gaseous fluid stream into separate branches which reunite in the fine purification section, causing additional turbulence aiding in separating the liquid from the gaseous fluid. The path of the gaseous fluid flow through the coarse separation section, past the fluid distributor, and through the fine purification section is such as to not cross the path of flow of the condensed liquid in the separate sections and in the portion of the separator in which the fluid distributor is located.

18 Claims, 13 Drawing Figures

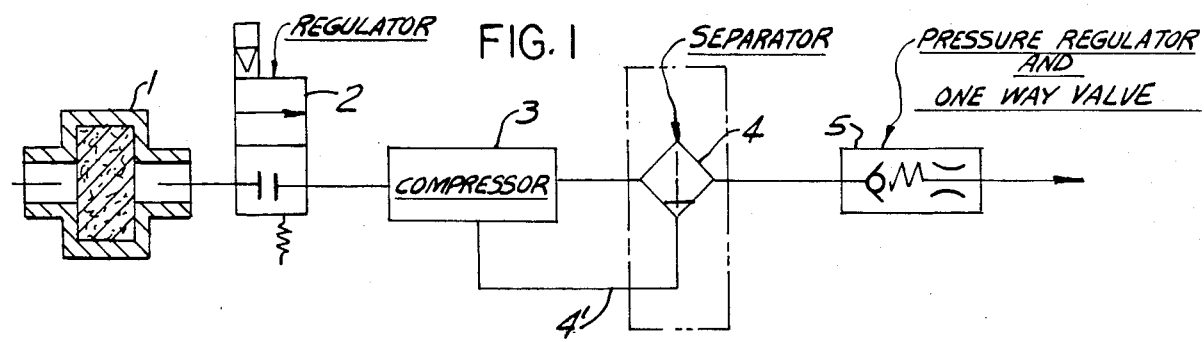
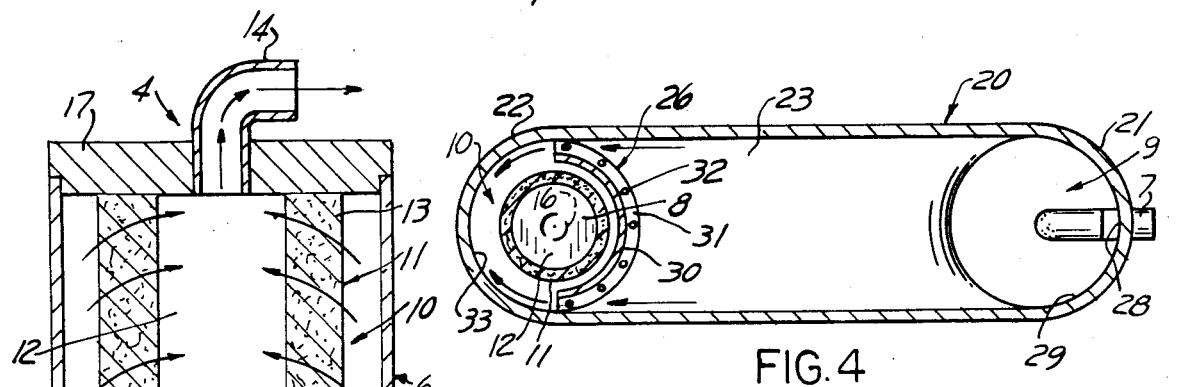
PRIOR ART
FIG. 2
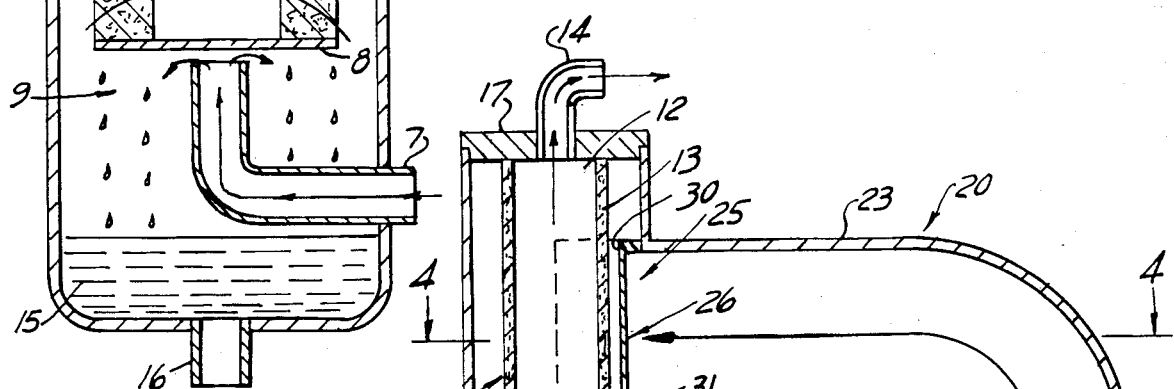
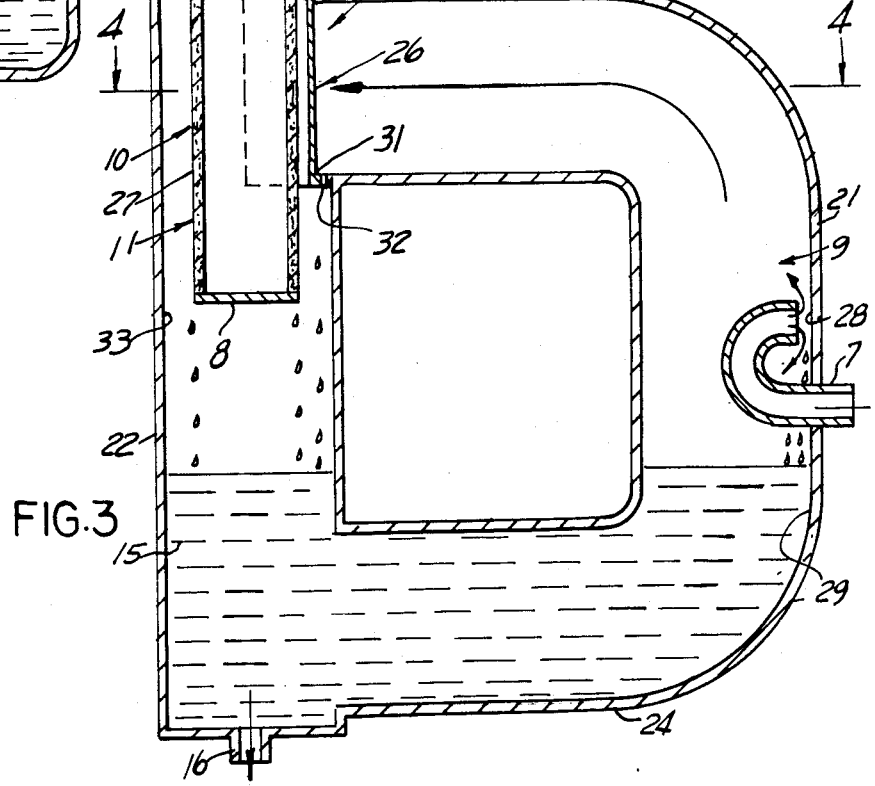

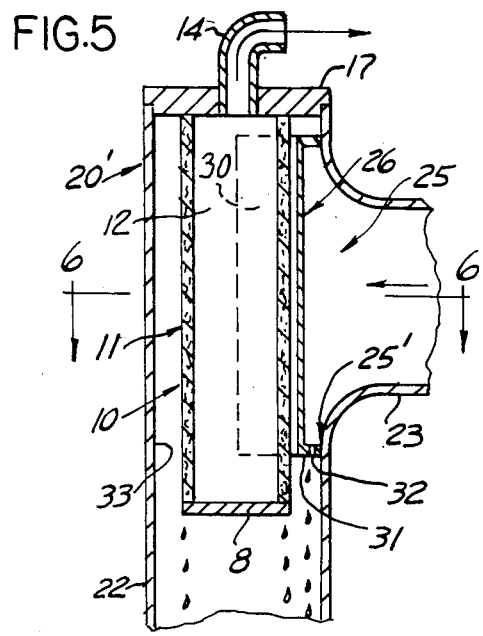
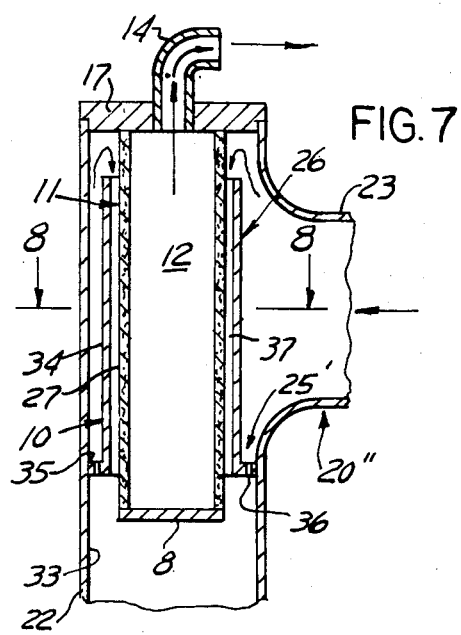
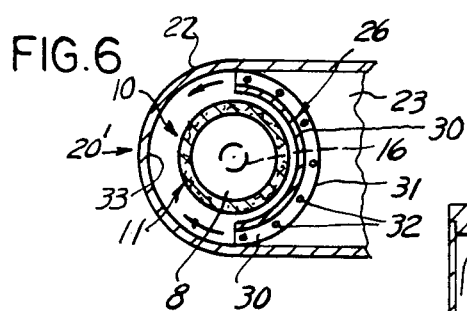
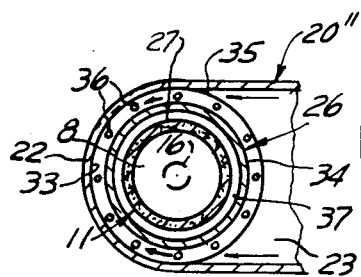
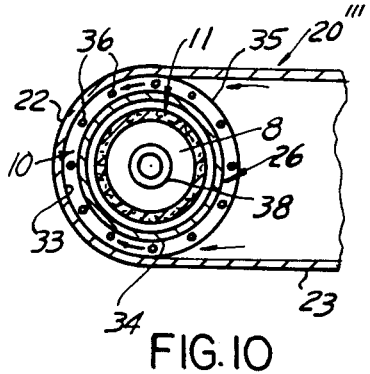
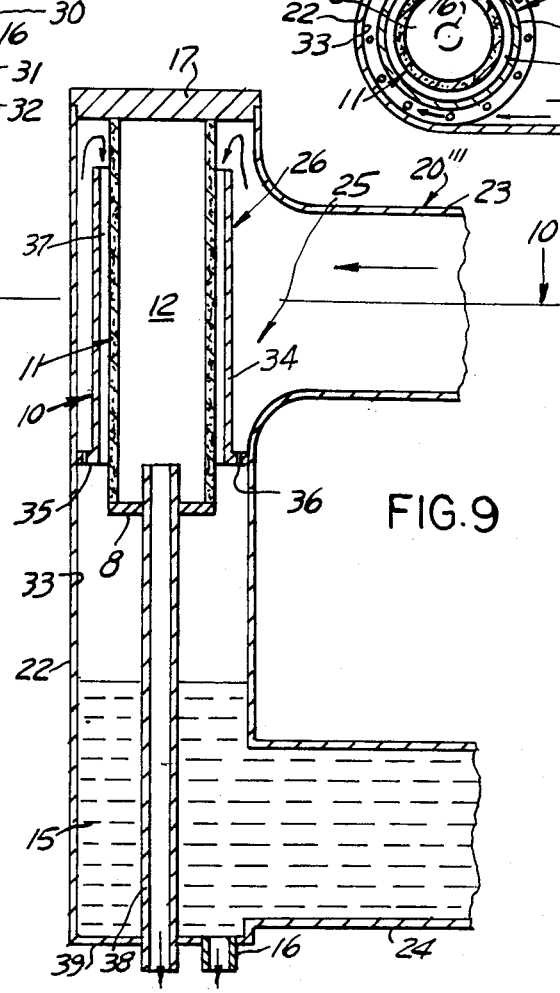

SEPARATOR FOR GASES AND LIQUIDS

CROSS-REFERENCE TO RELATED APPLICATION

The present application is related to application Ser. No. 744,261, filed contemporaneously with the present application, and assigned to the same assignee as this application.

BACKGROUND OF THE INVENTION

The present invention relates to a fluid separator, such as a separator for gases and liquids, for instance an oil/air separator for a compressed gas unit.

In conventional systems for compressing a gaseous fluid, a liquid, for example oil, finds itself added to the gaseous fluid during compression of the gaseous fluid in the compressor portion of the system. The liquid must be removed in a separating unit, prior to the compressed gaseous fluid being delivered to the consumer. Normally, a fluid separator, i.e. a gas/liquid separator, is used as a separating unit. Such a separator is connected to the compressor as part of the compressor gaseous fluid flow system. The separator usually includes a coarse separation section and a fine purification section. Both are installed in a vessel-like housing which is preferably of circular cylindrical shape. The gaseous fluid stream which enters the separator and which is to be processed, consists of a mixture of liquid and gas, a mixture of, for example, oil and air. The mixture is supplied to the inlet of the separator housing from the compressor outlet through a fluid inlet and is directed against a baffle which constitutes the coarse separation section of the separator. The bottom portion of the houisng forms a liquid collecting sump, i.e. an oil collecting sump, in which accumulates the liquid separated from the gaseous fluid in the coarse separation section and in the fine purification section disposed downstream. The coarse separation section usually consists of a circular baffle plate situated approximately in the center of the housing, whereas the fine purification section is concentrically installed above the baffle plate. The gaseous fluid processed in the separator is thereafter evacuated from the interior space of the purifying system and conducted out of the separator to the consumer.

The mixture of gaseous and liquid fluids introduced into the separator impinges upon the surface of the baffle plate of the coarse separation section and the liquid mist carried away during the compression stage is thus separated by impact from the gaseous fluid and coalesces in the form of droplets that fall down from the baffle plate into the liquid collecting sump. The gaseous fluid stream leaving the coarse separation section then rises to the fine purifying section, passes through its wall and enters the inner space of the fine purifier. In such a fluid separator the gaseous fluid stream, when rising from the coarse separating section to the fine purification section, crosses the path of the liquid separated from the gaseous fluid which is dropping to the liquid collection sump at the bottom of the separator housing.

In order to insure an adequate efficiency of separation of the liquid from the gaseous fluid, fluid separators, until now, had to have a relatively large diameter in order to reduce the velocity of the fluid stream flowing from the coarse separation section, so that the crossing streams of liquid and gaseous fluids would interfere with each other only in a way that the fluid stream rising to the fine purification section carries over as little of the already separated liquid as possible. In view of the relatively large dimensions of the fluid separator, considerable space is required, especially in comparison with the space required by the compressor itself. Moreover, the walls of the fluid separator must withstand the compression pressure of the fluid introduced from the compressor so that the fluid separator has to be constructed such as not to burst. This again results in a considerable weight of the fluid separator as well as in considerable expenditures for materials and manufacturing.

SUMMARY OF THE INVENTION

The principal object of the invention is to provide a suitable fluid separator of small dimensions and of compact construction without loss of efficiency, or even an improved separation efficiency. Other objects of the invention are to reduce the weight of fluid separators, and to simplify their manufacture and save materials without having to accept any loss in the liquid separating efficiency.

The fluid separator, forming the subject matter of the invention, accomplishes its objects by providing a fluid distributor installed between the coarse separation section and the fine purification section of the separator, downstream of the coarse separation section and close to the fine purification section. The fluid distributor is so designed that the gaseous fluid stream, when leaving the coarse separation section is caused to impinge upon the fluid distributor before reaching the purifier cartridge in the fine purification section, thus causing an additional intermediate stage of separation of the liquid from the gaseous fluid and acceleration of the fluid stream before reaching the fine purification section while, simultaneously, keeping the fluid stream away from the liquid separating from the gaseous fluid in the fine purification section and as a result of impinging upon the fluid distributor. Such an arrangement of elements insures, in an uncomplicated and creative manner, that the processed fluid stream does not cross paths with the liquid having separated from the gaseous fluid so that the dimensions of a fluid separator according to the invention can be reduced and a compact construction is achieved. A fluid separator according to the invention has a small space requirement, and provides an efficiently working fluid separator of surprisingly small dimensions. Furthermore, the fluid distributor is arranged in a way that the liquid separated from the gaseous fluid flows back to the coarse separation section, falling directly from the fluid distributor into the liquid collecting sump. Not only is the repeated carry-over of the already separated liquid avoided, but the fluid distributor further causes an intermediate separation before the fluid stream reaches the fine purification section so that, despite the compact construction, the overall efficiency of the fluid separator is greatly improved.

These and other objects of the present invention will become apparent to those skilled in the art when the following description of the best modes contemplated at the present for practicing the invention is read in conjunction with the accompanying drawing, wherein like numerals refer to like or equivalent parts, and in which:

BRIEF DESCRIPTION OF THE DRAWING

FIG. 1 is a block diagram of a gas compression system provided with a fluid separator;

FIG. 2 is a schematic longitudinal section of a fluid separator of the conventional type, showing the present state of the art;

FIG. 3 schematically represents an example of a fluid separator according to the present invention, shown in longitudinal section;

FIG. 4 is a section thereof along line 4—4 of FIG. 3;

FIG. 5 is a view of a portion of the structure of FIG. 3, but showing a modification of the invention;

FIG. 6 is a section thereof along line 6—6 of FIG. 5;

FIG. 7 is a view of a portion of the structure of FIG. 3, but showing a further modification of the present invention;

FIG. 8 is a section thereof along line 8—8 of FIG. 7;

FIG. 9 is a view of a portion of the structure of FIG. 3, but showing another modification of the present invention;

FIG. 10 is a section thereof along line 10—10 of FIG. 9;

DETAILED DESCRIPTION OF THE PREFERRED EMBODIMENTS

Figure 11:
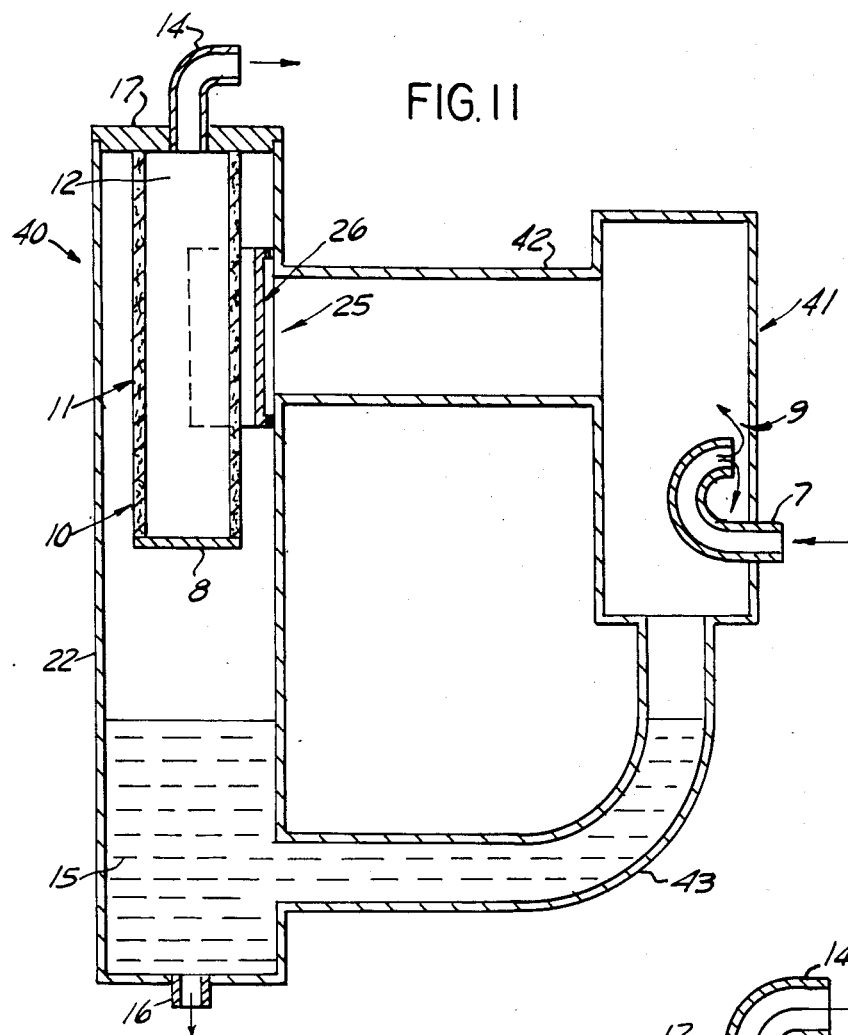
FIG. 11 is a schematic longitudinal section of another modification according to the present invention.

Referring to the drawing, and more particularly to FIG. 1, there is illustrated a compressor system for a gaseous fluid, such as atmospheric air for example. Atmospheric air is supplied through a filter 1 and an intake regulator 2 to the inlet of a compressor 3, such as a screw compressor, in which the air is compressed. The moving parts of the compressor 3 are lubricated with oil which forms a fine mist that mixes with the air compressed in the compressor 3. The gaseous fluid stream from the compressor 3, which contains oil in suspension in the compressed air, is caused to flow through a separator unit, generally designated at 4, in which the oil is separated as a liquid from the compressed air, as well as feasible, and the oil separated from the compressed air in the separator is fed back from the oil collecting sump of the separator 4 to the compressor 3 by means of an appropriate return conduit 4'. The procesed gaseous fluid, which is air in the instant example, from which most of the oil has been removed, is then supplied to the consumer, from the separator 4 through a pressure regulator and one-way valve 5.

Referring now to FIG. 2, there is illustrated, in a schematic manner, a separator 4 of conventional design. The fluid stream which in the example of application herein given for illustrative purpose, consists of an air-oil mixture, is introduced, in the direction of the arrow, from the compressor 3 of FIG. 1 into the housing 6 of the separator 4 through an inlet 7 in a form of a conduit having its end proximate a horizontally disposed baffle plate 8 placed in the coarse separation section 9 of the separator housing 6. The air fluid stream is thus caused to impinge upon the surface of the baffle plate 8 which is installed approximately in the center of the separator housing 6. A fine purification section 10 is installed at the top of the housing 6 and comprises a cylindrical purifier cartridge 11 made of a porous tubular member or jacket 13 of, for example, fabric or the like, surrounding a hollow interior 12. An outlet conduit 14 is affixed approximately in the center of an end cap 17 closing the top of the housing 6, the compressed and processed air or gas being caused to flow through the outlet conduit 14, for supply to a consumer.

The bottom portion of the separator housing 6 forms a liquid collecting sump 15 in which the liquid, namely oil in the present example of application, collects for feedback through an outlet 16 to the compressor 3 of FIG. 1, via the conduit 4'.

The arrows in FIG. 2 indicate the fluid flow through the housing 6 of the fluid separator 4. When the fluid stream impinges upon the surface of the baffle plate 8 in the coarse separation section 9, liquid droplets, that is oil droplets, are formed as a result of dynamic condensation or coalescence of the oil mist carried in the stream of compressed air, and the oil droplets resulting from the separation of the oil from the air stream which are formed on the bottom surface of the baffle plate 8, fall to the bottom of the housing 6 and collect in the sump 15. When leaving the coarse separation section 9, the air stream is readily diverted by the baffle plate 8 towards the wall of the housing 6 and rises into the fine purification section 10. The air stream is there caused to pass through the tubular jacket 13 of the purifier cartridge 11 into its interior portion 12. As the oil separated from the air by the purifier cartridge 11 in the fine purification section 10 drops from the outer edge of the baffle plate 8 into the liquid collecting sump 15, the air stream diverted by the baffle plate 8 crosses the path of the falling oil droplets which were previously separated from the air in both the coarse separation section 9 and the fine purification section 10. In order to prevent too many of the already separated oil droplets from being carried away in the air stream, the speed of the air stream has to be slowed down considerably. Consequently, the internal diameter of the fluid separator housing 6 has to be pretty large. The result is that the fluid separator 4 is very bulky, very heavy, and its separating efficiency is not always satisfactory.

FIGS. 3-4 illustrate a first embodiment of a fluid separator, generally designated at 20, according to the present invention. The fluid separator 20 comprises a first cylinder 21, in which the coarse separation section 9 is installed, and a second cylinder disposed in parallel with the first cylinder and containing the fine purification section 10 in which is disposed the purifier cartridge 11. The upper and lower ends of both cylinders 21 and 22, which are preferably made of tubular members such as pipes, are interconnected by cross-channels or conduits 23 and 24. In the outlet portion 25 of the cross-over channel or pipe 23, a fluid distributor or shield 26, is installed in the flow path from the coarse separating section 9 to the fine purification section 10. The fluid distributor 26 takes the form of a half-cylindrical baffle 30, supported by a flange 31, spaced-apart from the peripheral surface 27 of the purifier cartridge 11 installed in the fine purification section 10 of the separator 20. The stream of fluid rising from the coarse separation section 9 in the first cylinder 21 is directed by the cross-over pipe 23 such as to impinge on the wall of the fluid distributor 26. As a result of impinging upon the wall of the fluid distributor 26, the liquid, namely oil, still remaining in the fluid stream condenses and drops from the lower edge of the fluid distributor 26 through apertures 32 in the flange 31 into the liquid collecting sump 15. Simultaneously, the fluid distributor 26 causes an acceleration of the velocity of flow of the fluid stream before it reaches the fine purification section 10 of the separator, and diverts the stream away from the liquid being separated from the fluid stream, thus practically excluding any possibility that the fluid stream, before reaching the fine purification section 10, carries away any liquid which has already been separated from the gaseous fluid.

It will be appreciated that the coarse purification section 9 of the separator 20, installed in the upwardly disposed first cylinder 21, consists of the inlet conduit 7 which is bent over 180° such that its outlet is directed towards an area 28 of the inner wall 29 of the cylinder 21, so as to cause the fluid flow at the inlet of the separator 20 to impinge upon the area 28 of the cylinder inner wall 29, thus causing preliminary coalescence and condensation of the liquid mist entrained in the fluid flow, in the form of droplets that fall into the liquid collecting sump 15.

As best shown at FIG. 4, the fluid distributor 26, which takes the form of the half-cylindrical baffle plate 30 made of sheet metal concentrically surrounding over an arc of about 180° the purifier cartridge 11 in the fine purification section 10, divides the oncoming fluid stream into two radially diverging branches, as shown by the arrows, that cause considerable swivelling motion of the branched streams where they are reunited before passing through the purifier cartridge 11. In this manner, the fluid distributor 26 provides an additional stage of liquid separation, between the coarse separation section 9 and the fine purification section 10 of the system, such that the over-all efficiency of the fluid separator 20 is considerably increased, compared to conventional structures.

In addition, as it is clearly seen from FIG. 3, the level of the liquid in the liquid collecting sump 15, which is thus formed in the lower cross-over pipe 24 and the bottom portion of the cylinders 21 and 22, is constantly filled with liquid through an appropriate control of the liquid flow rate through the outlet 16, such as to operate as a liquid seal forcing the flow of fluid into the separator 20 to be effected from the cylinder 21 to the cylinder 22 through the upper cross-over pipe 23, thus causing impingement of the fluid stream upon the fluid distributor 26 and into the final purifying section 10. It will also be appreciated that the liquid separated from the gaseous fluid in the fine purification section 10 drips from the bottom of the filter cartridge 11, the liquid separated from the gaseous fluid upon impinging on the fluid distributor 26 drips from the bottom of the baffle plate 30 through the apertures 32 in the flange 31, the liquid separated from the gaseous fluid in the coarse separation section 9 flows along the surface of the inner wall 29 of the cylinder 21, and the liquid further separated from the gaseous fluid as a result of impinging upon the inner wall 33 of the cylinder 22 flows along the surface of the inner wall 33, all into the liquid collecting sump 15. In this manner, none of the separate liquid flows interferes with another on its way to the liquid collecting sump 15, and there is no possibility for a gaseous fluid stream to cross the paths of flow of the liquid being separated from the gaseous fluid, with the result that in spite of the compact structure of the fluid separator 20 an extremely high degree of separation of the liquid from the gaseous fluid is achieved.

In addition, the fluid separator 20 is relatively simple in structure and can be easily manufactured of a few pieces of pipe, preferably all of the same diameter, which are welded together, such that the separator 20 may be made with an appropriate pressure rating.

FIGS. 5–6 illustrate a portion of a modified fluid separator 20'. The only difference in structure, as compared to the fluid separator 20 of FIGS. 3–4, is in the outlet portion 25 of the cross-over pipe 23 being provided with an enlarged diameter, as shown at 25', as compared to the structure of FIGS. 3–4, so that the surface area of the fluid distributor 26 onto which the fluid stream impinges when passing from the cross-over pipe 23 to the second cylinder 22 is substantially greater. In this manner, the separating efficiency of the fluid separator of the invention can still be increased.

The fluid separator 20" of FIGS. 7–8 is also provided with an enlarged diameter portion 25'0 at the outlet of the cross-over pipe 23 where it connects to the cylinder 22. The fluid distributor 26 is in the form of a tubular member 34 disposed concentrically to and entirely surrounding the filter cartridge 11. The tubular member 34 of the fluid distributor 26 is fastened in the cylinder 22, below the enlarged outlet section 25' of the cross-over pipe 23, by means of an annular flange 35 welded, for example, to the inner wall 33 of the cylinder 22. The annular flange 35 is provided with a plurality of outlet apertures 36, preferably disposed at regular intervals, for allowing the liquid separated from the gaseous fluid stream as a result of impingement upon the tubular body member 34 of the fluid distributor 26 to flow into the liquid collecting sump.

The fluid distributor 26, due to its shape as a tubular member 34 surrounding the filter cartridge 11, diverts the stream of fluid, principally towards the top of the cylinder 22, which is thus caused to flow downwardly in the space 37 between the peripheral surface 27 of the purifier cartridge 11 and the inner wall surface of the tubular body member 34 of the fluid distributor 26, and through the wall of the filter cartridge 11 to the interior 12 of the cartridge and out through the outlet pipe 14. This increases substantially the turbulence of the air flow and the length of the air flow path, the direction of flow in the space 37 being the same as the direction of flow of the droplets of liquid coalesced on the peripheral surface 27 of the cartridge and the internal wall of the tubular body member 34. In this manner, the purifying effect of the fine purification section 10 is therefore improved.

FIGS. 9 and 10 illustrate a further modification of a fluid separator generally designated at 20'''. Basically, the structure of the fluid separator 20''' is similar to the structure illustrated at FIGS. 7–8, the only difference being that the outlet of the gaseous stream from the fluid separator 20''', instead of being effected through the enclosure cap 17 of the cylinder 22, is effected via a conduit 38 connecting the interior 12 of the filter cartridge 11 in the fine purification section 10, through the liquid collecting sump 15 to the exterior of the separator 20''' through the bottom 39 of the cylinder 22. It is readily apparent that providing the outlet of the fluid flow through the bottom of the fluid separator can be incorporated into the other embodiments of the invention illustrated at FIGS. 3–8.

FIG. 11 illustrates an alternative structure for a fluid separator generally designated at 40. In the structure of FIG. 11, the coarse separation section 9 takes the form of a separate prefiltering unit 41 which can be of a conventional structure, such as a mechanical separator. The prefiltering unit 41 is connected by a pipe or conduit 42 to the fine purification section 10 in the cylinder 22. The bottom of the cylinder 22 is connected to the prefiltering unit 41 via a conduit 43, the conduit 43 and the bottom of the cylinder 22 forming the liquid collecting sump 15. The fluid distributor 26 is installed between the outlet of the conduit 42 and the inlet of the fine purifying section 10. The fluid distributor 26 may be of any of the structure previously described. The structure of FIG. 11 allows for the manufacturing of the prefiltering section 41 and the fine purfiying section 10 in appropriate dimensions, and for connecting the two sections by appropriate conduits, such as conduits 42 and 43.

Figure 12:
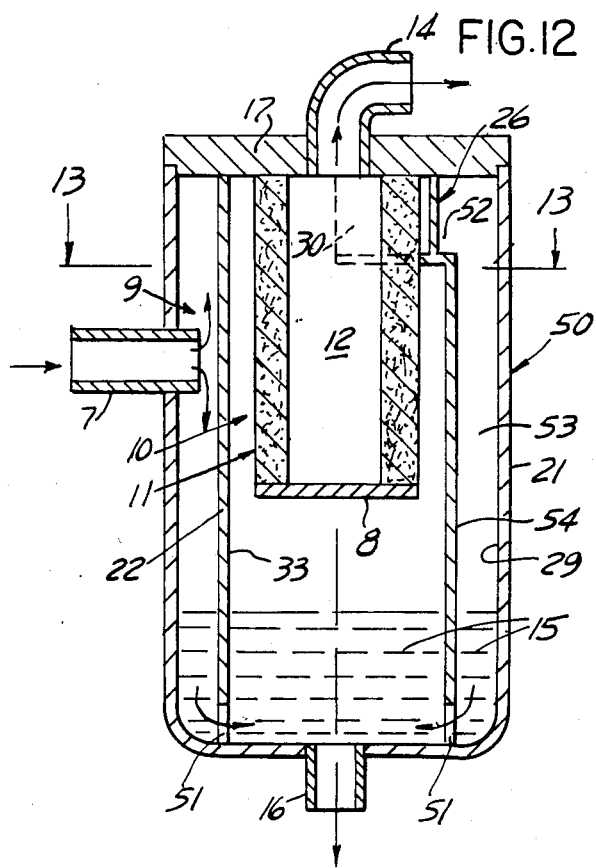
FIG. 12 is a schematic representation, in longitudinal section, of a further modification according to the present invention.
Figure 13:
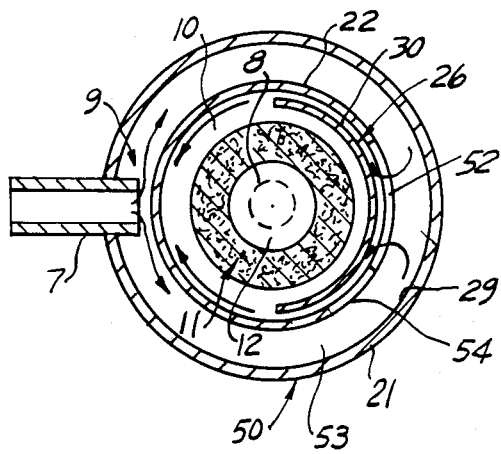
FIG. 13 is a section along line 13—13 of FIG. 12.

FIGS. 12–13 illustrate a further modification of a fluid separator, generally designated at 50, in which the general principles of the invention are maintained and a very compact structure is achieved by disposing the two cylinders 21 and 22 concentrically one within the other, the cylinder 21 being disposed peripherally to the cylinder 22 and actually forming the housing of the fluid separator 50. Apertures, as shown at 51 at FIG. 12, are formed at the bottom of the inner cylinder 22 to provide liquid fluid communication between the cylinder 22 and the cylinder 21 defining the liquid collecting sump 15 at their bottom. The cylinder 22 extends at its top all the way to the closure end cap 17, except for an aperture 52, as best shown at FIG. 13, placing the space 53 between the interior surface 29 of the cylinder 21 and the outer surface 54 of the cylinder 22 in communication with the interior of the cylinder 22. The fluid distributor 26 takes the form of a half-cylinder 30, as best shown at FIG. 13. Fluid is introduced into the separator 50 through the inlet conduit 7 disposed radially through the wall of the outer cylinder 21, diametrically opposite the opening 52. The fluid flowing through the inlet 7 impinges upon the exterior surface 54 of the cylinder 22, which causes droplets of liquid to coalesce and form on the exterior surface 54 of the cylinder 22 and flow into the liquid collecting sump 15. The annular space 53 between the two cylinders 21 and 22 thus defines the coarse purifying section 9 of the fluid separator 50. After passage through the opening 52 and impinging upon the fluid separator 26, which cause further condensation of the liquid mist and the formation of droplets, the fluid stream is caused to flow through the fine filtering cartridge 11 to the interior 12 of the cartridge and out the outlet 14 through the end cap 17.

It will be appreciated by those skilled in the art that many variations of the invention are possible within the principles of the invention as defined in the appended claims.

I claim:

1. In an apparatus for separating from a stream of compressed gaseous fluid a liquid entrained in said stream of compressed gaseous fluid, said apparatus comprising a vessel having an inlet and an outlet, a coarse separation section in said vessel at said inlet and comprising a baffle on which said stream of compressed gaseous fluid is caused to impinge whereby liquid entrained in said stream of compressed gaseous fluid is caused to condense and separate from said gaseous fluid, and a fine purification section in the vessel between the coarse separation section and the outlet of the vessel wherein said stream of gaseous fluid is caused to pass through a filter cartridge causing further condensation of said liquid, said liquid separating from said gaseous fluid dropping by gravity in a liquid collecting sump at the bottom of said vessel, the improvement comprising a fluid distributor disposed between the coarse separation section and the fine purification section, said fluid distributor comprising baffle means on which said stream of gaseous fluid is caused to impinge, whereby additional separation of said liquid from said gaseous fluid takes place upon impingement on the baffle means of said fluid distributor, wherein the baffle means of said fluid distributor is arranged to accelerate said stream of gaseous fluid impinging upon it and direct said stream away from the path of condensed liquid flowing into the liquid collecting sump; and wherein the baffle means of said fluid distributor divides said stream of gaseous fluid into partial streams which are reunited prior to entering the fine purification section.

2. The improvement of claim 1 wherein the baffle means of said fluid distributor comprises a substantially half cylindrical baffle plate disposed at the inlet of said fine purification section and partially surrounding said filter cartridge.

3. The improvement of claim 1 wherein the baffle means of said fluid distributor is in the form of a cylindrical baffle plate disposed concentric to said filter cartridge and surrounding said filter cartridge.

4. The improvement of claim 1 wherein said outlet from said vessel is disposed at the top of said filter cartridge.

5. The improvement of claim 1 wherein said outlet from said vessel is disposed through a closure plate at the bottom of said filter cartridge and is in the form of a pipe leading from the interior of said cartridge to the exterior of said vessel through said liquid collecting sump.

6. The improvement of claim 1 wherein said vessel comprises a first cylinder and a second cylinder, the coarse separation section being disposed in the first cylinder and the fine purification section being disposed in the second cylinder, said first cylinder being connected to said second cylinder by a first conduit disposed at the top of said cylinders and by a second conduit disposed at the bottom of said cylinders, the baffle means of said fluid distributor being located at the outlet of said first conduit, and said second conduit defining with the bottom portion of said cylinders the liquid collecting sump.

7. The improvement of claim 6 wherein the baffle means of said fluid distributor comprises a substantially half cylindrical baffle plate disposed at the inlet of said fine purification section and partially surrounding said filter cartridge.

8. The improvement of claim 6 wherein the outlet of said first conduit at which the baffle means of said fluid distributor is located is of enlarged diameter such as to reduce the velocity of the stream of gaseous fluid flowing into said fine purification section.

9. The improvement of claim 6 wherein the coarse separation section in said first cylinder comprises the inlet of the vessel having a bent-over tubular portion projecting in said first cylinder, said bent-over tubular portion having an outlet disposed proximate the interior wall of said first cylinder.

10. The improvement of claim 6 wherein said first and second cylinders are disposed concentrically and are placed in mutual fluid communication at their bottom, the inlet of the vessel being a tubular member having an outlet disposed proximate to the wall of the innermost one of said cylinders, the baffle means of said fluid distributor being located behind an opening disposed at the top of said innermost cylinder, an annular space between the inner wall of the outermost of said cylinders and the outer wall of the innermost of said cylinders defining the coarse separation section, and the fine purification section being disposed within the innermost of said cylinders.

11. The improvement of claim 6 wherein the baffle means of said fluid distributor is in the form of a cylindrical baffle plate disposed concentric to said filter cartridge and surrounding said filter cartridge.

12. The improvement of claim 1 wherein said vessel comprises a first cylinder and a second cylinder, the coarse separation section being disposed in the first cylinder and the fine purification section being disposed in the second cylinder, said first cylinder being connected to said second cylinder by a first conduit disposed at the top of said cylinders and by a second conduit disposed at the bottom of said cylinders, the baffle means of said fluid distributor being located at the outlet of said first conduit, and said second conduit defining with the bottom portion of said cylinders the liquid collecting sump.

13. The improvement of claim 12 wherein the baffle means of said fluid distributor comprises a substantially half cylindrical baffle plate disposed at the inlet of said fine purification section and partially surrounding said filter cartridge.

14. The improvement of claim 12 wherein the baffle means of said fluid distributor is in the form of a cylindrical baffle plate disposed concentric to said filter cartridge and surrounding said filter cartridge.

15. The improvement of claim 1 further comprising a collected liquid outlet disposed at the bottom of said liquid collecting sump.

16. The improvement of claim 15 wherein the baffle means of said fluid distributor comprises a substantially half cylindrical baffle plate disposed at the inlet of said fine purification section and partially surrounding said filter cartridge.

17. The improvement of claim 15 wherein the baffle means of said fluid distributor is in the form of a cylindrical baffle plate disposed concentric to said filter cartridge and surrounding said filter cartridge.

18. A method for separating from a stream of compressed gaseous fluid a liquid entrained in said stream, said method comprising introducing said stream of gaseous fluid into a vessel, causing said stream of gaseous fluid to impinge in a coarse separation section in said vessel upon a surface to separate a first portion of said liquid from the gaseous fluid, directing the stream of gaseous fluid away from said coarse separation section while preventing the path of said stream of gaseous fluid from crossing the path of flow of liquid separated therefrom in said coarse separation section, subsequently passing said stream of gaseous fluid in said vessel through an intermediary separation section comprising a baffle plate onto which said stream of gaseous fluid is caused to impinge to separate a second portion of said liquid from the gaseous fluid and to divide said stream into two partial streams and to cause said partial streams each to accelerate away from said separated second portion of fluid, reuniting said partial streams, and finally passing said reunited stream of gaseous fluid through a fine purification section separating a third portion of said liquid from the gaseous fluid, constantly maintaining the path of flow of said stream of gaseous fluid away from the path of the liquid flow in said coarse purification portion, in said intermediary separation section and in said fine purification section, and collecting the liquid dropping by gravity from said coarse purification section, said intermediary purification section and said fine purification section in a common sump.

* * * * *

UNITED STATES PATENT AND TRADEMARK OFFICE
CERTIFICATE OF CORRECTION

PATENT NO. : 4,666,473

DATED : May 19, 1987

INVENTOR(S) : Alfred Gerdau

It is certified that error appears in the above-identified patent and that said Letters Patent is hereby corrected as shown below:

Col. 4, line 46 after "cylinder", insert --22--.

Col. 6, line 15, change "25'0" to -- 25' --.

Signed and Sealed this

Eighth Day of December, 1987

Attest:

DONALD J. QUIGG

Attesting Officer      Commissioner of Patents and Trademarks